United States Patent
Kolbenschlag (10) Patent No.: US 10,048,092 B2
(45) Date of Patent: Aug. 14, 2018

(54) TORSIONAL MOMENT AND ANGLE SENSOR AND ACTUATOR DRIVE

(71) Applicant: Samson Aktiengesellschaft, Frankfurt am Main (DE)

(72) Inventor: Stefan Kolbenschlag, Darmstadt (DE)

(73) Assignee: SAMSON AKTIENGESELLSCHAFT, Frankfurt am Main (DE)

( * ) Notice: Subject to any disclaimer, the term of this patent is extended or adjusted under 35 U.S.C. 154(b) by 172 days.

(21) Appl. No.: 14/757,707

(22) Filed: Dec. 23, 2015

(65) Prior Publication Data
US 2016/0178396 A1   Jun. 23, 2016

(30) Foreign Application Priority Data
Dec. 23, 2014  (DE) .......................... 10 2014 019 547

(51) Int. Cl.
| | |
|---|---|
| *G01L 3/14* | (2006.01) |
| *G01D 5/16* | (2006.01) |
| *G01L 5/22* | (2006.01) |
| *G01L 3/10* | (2006.01) |
| *G01P 3/481* | (2006.01) |
| *G01P 3/487* | (2006.01) |
| *F16K 37/00* | (2006.01) |

(52) U.S. Cl.
CPC ........... *G01D 5/16* (2013.01); *F16K 37/0041* (2013.01); *G01L 3/101* (2013.01); *G01L 3/104* (2013.01); *G01L 5/221* (2013.01); *G01P 3/481* (2013.01); *G01P 3/487* (2013.01)

(58) Field of Classification Search
CPC ........... G01D 5/16; G01L 3/101; G01L 3/104; G01L 5/221; G01P 3/481; G01P 3/487
USPC ...................................... 73/862.331
See application file for complete search history.

(56) References Cited

U.S. PATENT DOCUMENTS

| | | | | |
|---|---|---|---|---|
| 3,590,701 | A * | 7/1971 | Ten Broeck | E01C 23/18 156/523 |
| 5,097,209 | A * | 3/1992 | Santos | F02P 7/0677 123/617 |
| 5,487,302 | A * | 1/1996 | Casada | F16K 31/046 73/168 |
| 7,326,143 | B2 * | 2/2008 | Kimura | F16H 1/32 475/149 |
| 9,341,062 | B2 | 5/2016 | Kolbenschlag et al. | |
| 2003/0037622 | A1 | 2/2003 | Laidlaw | |
| 2003/0145663 | A1 | 8/2003 | Heisenberg et al. | |

(Continued)

FOREIGN PATENT DOCUMENTS

| | | |
|---|---|---|
| DE | 19951575 A1 | 5/2001 |
| DE | 10041095 A1 | 6/2001 |

(Continued)

*Primary Examiner* — Max Noori
(74) *Attorney, Agent, or Firm* — Schiff Hardin LLP (57) ABSTRACT

In a torsional moment and angle sensor for determining a torsional moment to be transferred from a drive member to a driven member, an at least partially circumferential drive side encoder ring section is provided. A contactless sensor scans the drive side encoder ring section. A driven side encoder ring section is provided via which an angular position of the driven member is scanned. The sensor for scanning the drive side encoder ring section is coupled to the drive side encoder ring section via a torsion spring bridge having a predetermined torsional elasticity.

20 Claims, 5 Drawing Sheets

(56) References Cited

U.S. PATENT DOCUMENTS

| | | | |
|---|---|---|---|
| 2004/0015307 A1 | 1/2004 | Heisenberg | |
| 2007/0000455 A1* | 1/2007 | Akiyama | F02D 11/106 123/19 |
| 2008/0060451 A1* | 3/2008 | Puzio | B25B 23/1456 73/862.324 |
| 2008/0191691 A1* | 8/2008 | Baudendistel | G01D 5/145 324/207.25 |
| 2009/0315544 A1* | 12/2009 | Takahashi | F16C 41/007 324/207.25 |
| 2010/0064822 A1* | 3/2010 | Debrailly | B62D 6/10 73/862.326 |
| 2012/0105055 A1* | 5/2012 | Takahashi | F16C 41/007 324/207.25 |

FOREIGN PATENT DOCUMENTS

| | | |
|---|---|---|
| DE | 10041092 A1 | 3/2002 |
| DE | 10240049 A1 | 4/2003 |
| DE | 10230347 B4 | 1/2004 |
| DE | 10345138 A1 | 4/2005 |
| DE | 202012010675 U1 | 11/2012 |
| EP | 1077359 A2 | 2/2001 |
| EP | 1382510 A1 | 1/2004 |
| WO | 0216188 A1 | 2/2002 |

* cited by examiner

TORSIONAL MOMENT AND ANGLE SENSOR AND ACTUATOR DRIVE

BACKGROUND

The disclosure relates to a torsional moment and angle sensor for determining a torsional moment to be transferred from a drive member to a driven member as well as an absolute angle of rotation of the driven member. In particular, the disclosure relates to a torsional moment and angle sensor for determining a rotational angle and a torsional moment to be transferred from an activator drive from a processing plant such as a refinery, a foodstuff processing plant or the like, to a control valve, such as a pneumatically actuated ball valve of such a plant. The disclosure further relates to an actuator drive for a processing plant having a torsional moment and angle sensor for determining a torsional moment to be transferred from a drive member of the actuator drive to a driven member of the control valve of the processing plant and an angle of rotation of the control valve.

A known torsional moment and angle sensor in the field of automotive technology is disclosed in DE 100 41 090 A1. The known torsional moment sensor and the angle sensor comprises two encoder wheels arranged on very rigid steering shaft which are scanned for detecting a respective distortion angle of the encoder wheels by sensor elements that are fixed stationary with respect to the rotatable steering shaft. A torsional moment is calculated from the angle difference between the two encoder wheels. However, the known torsional moment and angle sensor has the disadvantage of that, due to the torsionally rigid steering shaft, two very precisely measuring angle sensors as well elaborate calibration and measurement correction methods are required in order to determine the torsional moment from the angle difference. If thereby one of the angle sensors fails, determining the torsional moment is no longer possible.

SUMMARY

It is an objective to provide a torsional moment and angle sensor which overcomes the disadvantages of the prior art and which in particular reliably provides a torsional moment and an angle signal with the least metrological effort.

In a torsional moment and angle sensor for determining a torsional moment to be transferred from a drive member to a driven member, an at least partially circumferential drive side encoder ring section is provided. A contactless sensor scans the drive side encoder ring section. A driven side encoder ring section is provided via which an angular position of the driven member is scanned. The sensor for scanning the drive side encoder ring section is coupled to the drive side encoder ring section via a torsion spring bridge having a predetermined torsional elasticity.

DESCRIPTION OF EXEMPLARY EMBODIMENTS

For the purposes of promoting an understanding of the principles of the invention, reference will now be made to the preferred exemplary embodiments/best mode illustrated in the drawings and specific language will be used to describe the same. It will nevertheless be understood that no limitation of the scope of the invention is thereby intended, and such alterations and further modifications in illustrated embodiments and such further applications of the principles of the invention as illustrated as would normally occur to one skilled in the art to which the invention relates are included herein.

A torsional moment and angle sensor is provided for determining a torsional moment to be transferred from a drive member to a driven member is provided which comprises an at least partially circumferential drive side encoder ring section, such as a pole ring section, a contactless sensor for scanning or sampling the drive side encoder ring section, and a driven side encoder ring section via which the angular position of the driven member can be scanned. According to an exemplary embodiment, the sensor for scanning the drive side encoder ring section is coupled to the drive side encoder ring section via a torsion spring bridge having a predetermined torsional elasticity.

The torsion spring bridge allows a precisely predetermined twist or distortion between the drive member and the driven member and permits the direct measurement of the distortion by means of a sensor by scanning the path distance traveled by the drive side encoder ring relative to a reference position of the sensor. The encoder ring section is attached on one end of the torsion spring bridge essentially torsionally rigid or at least having a negligible torsional elasticity in comparison to the elasticity of the bridge. The reference position of the sensor is defined on the opposite end of the torsion spring bridge. The absolute angle of rotation on the driven side is shown by a further, driven side encoder ring section, such as a partial pole ring or an annular pole ring. These provisions allow for an independency of the torsional moment measurement from the angle measurement. Since only the relative distortion measurement between the drive side encoder ring section and the sensor connected via the torsion spring bridge requires a high precision, whereas the measurement of the absolute angle can still be relatively inprecise without impairing the measurement of the torsional moment, and much simpler measurement method having a lower precision can be utilized for the angle measurement, so that altogether a cheap yet nevertheless reliably and precisely measuring sensor is provided.

It shall be clear that the driven member is suitable as a drive member and the drive member is suitable as a driven member without limitation to the teaching of the exemplary embodiment and that this functionally equal inversion is to be understood as an alternate exemplary embodiment.

The sensor for measuring the torsional moment and angle comprises electronic circuitry which are in particular integrated in the sensor arranged on the driven side which electronic circuitry provides a torsional moment signal and an angular positioning signal.

The torsional moment signal and/or the angular positioning signal can be digitally or in analog fashion transferred so that for example the angular positioning sensor can directly act as a position repeater or position detector or which can provide a return signal for a position controller which for instance belongs to a field device. Thus, measurement error due to clearance or tolerances can be used. When the torsional moment and angle sensor is part of a processing control armature including an actuator drive and a control valve, such a design allows to mount the controller separate from actuator drive and/or control valve. Alternatively, the torsional moment sensor and angle sensor according to the exemplary embodiment can be used in addition to a common position controller in order to measure the clearance between the actuator drive and angle sensor.

The torsional moment signal can be utilized by the evaluator or the control room, respectively, directly for a diagnosis function, for example for monitoring whether a defect occurs, such as a broken control shaft.

The electronic circuitry can include a threshold value detector which creates a warning signal when a predetermined threat threshold value is exceeded or fallen below by the particularly analog fashion signal from the torsional moment sensor and/or rotation angle signal, in particular to abort a test. The electronic circuitry can also comprise one or more threshold value detectors, which, on the basis of an upper threshold value, and a lower threshold value, define a predetermined torsional moment range or angular position range, wherein the threshold value detector or the threshold values detectors are configured to create the warning signal when the predetermined signal range is left.

Preferably, the electronic circuitry comprises a limit value detector for creating a particularly digital limit value signal due to exceeding or falling below a predetermined limit value, particularly an angle-limit-value and/or torsional moment limit value. A sensor including a limit-value detector can thus be useable as a limit signal generator or limit switch.

The contact free or contactless operating sensor measures a relative change of position between the sensor and a reference position of the encoder ring section which is in particular initially defined, for instance upon commencing operation, or periodically defined. The encoder ring section is preferably realized by an optical or magnetic marking or multiple markings, which alternate with sections without marking, the markings in particular revolving concentrically around an axis of rotation. The code formed by markings and possibly by non-markings extends along the predetermined movement direction of the encoder ring section. The changing marking is registered by the sensor for scanning the encoder ring section, and from the pre-known code, the traveled path distance can be identified with the highest precision. In particular, the encoder ring section comprises a regular, preferably optical or magnetic marking profile which allows the sensor to scan along the traveled distance path by interpreting the marking profile. It shall be clear that the drive side encoder ring section and the driven side encoder ring section be configured equally or can be realized using different measurement principles, such as optical and magnetic, in order to increase operating safety. The torsion spring bridge is an elastic, intentionally deforming part, the torsional elasticity of which is predetermined during the design of the sensor according to the expected torsional moments and path-resolution of the sensor. The contact-free operating sensor measures the travel path difference between driven member and drive member. From the travel path difference, the sensor creates, on the basis of the predetermined torsional elasticity, a torsional moment signal proportional to the travel path distance. In a preferred embodiment, the driven side scanning sensor and the driven side encoder ring section are rigidly, particularly torsionally rigid, coupled to one another. The torsional rigidity between the driven side scanning sensor and the driven side encoder ring section is at least so high that, when torsional moments are transferred from the drive member to the driven member within a specified nominal range of the sensor, no relative movement resolvable by the sensor is measurable. In particular, the driven side scanning sensor and the driven side encoder ring section are arranged concentrically with respect to the torsion spring bridge.

In a preferred embodiment, the torsion moment and angle sensor determines the torsional moment independent of a scan of the angle position of the driven member. In particular, the torsional moment and angle sensor provides a torsional moment signal created by the effective torsional moment from a relative movement between the contact free operating sensor for scanning the drive side encoder ring section and the drive side encoder ring section as well as the torsional elasticity of the torsion spring bridge. This direct measurement can be realized particularly cheap and energy-saving. The sensor simultaneously provides a signal which indicates the absolute angular position of the driven member relative to an initial position in relation to a particularly stationary housing or a mounting of the torsional moment and angle sensor. In another preferred embodiment, the torsional moment is detected and/or recorded time- or path-dependent.

In a preferred embodiment, the sensor for scanning the drive side encoder ring section is arranged rotationally moveable relative to an angular position of the sensor for scanning the driven side encoder ring section. Preferably, the angular position sensor is arranged stationary relative to the sensor for scanning the drive side encoder ring section or relative to the drive side encoder ring section. In particular, the angular positioning sensor is arranged on a sensor housing and/or a mounting of a torsional moment and/or angle sensor. In particular, the sensor for scanning the drive side encoder ring section and the angular positioning sensor are connected via a common electric supply line. Preferably, the maximum angular measurement range of the angular positioning sensor is limited to at most 180°, in particular 150°, 120° or 90°. Preferably, the energy supply of the signal transmission of the contact-free operating sensor for scanning the drive side encoder ring section as well the angular positioning sensor is cable-bound.

In a preferred embodiment, the torsion spring bridge comprises a torsional moment transmitting distortion portion between the drive member and the driven member, as well as a sensor carrier essentially decoupled from the flow of torsional moment between drive- and driven member. In particular, the twisting or distortion portion receives on a drive side end thereof the drive side encoder ring section. In particular, on a driven side end of the distortion portion, the sensor carrier is fastened. It shall be clear that the sensor carrier, in comparison to the distortion portion, has a negligible torsional elasticity or multiple torsional rigidity. In particular, the driven side scanning sensor and the driven side encoder ring section are arranged axially offset. Preferably, the sensor carrier surrounds the distortion portion in the shape of a concentrically surrounding sleeve. In particular, the distortion portion spans an axial distortion range, which, in comparison to the driven side attachment end and the drive side attachment end of the distortion portion, is weakened in the cross-section thereof. Through the above-mentioned provisions, a particularly compact design is achieved.

In a preferred embodiment, a sensor carrier attached on the driven side spans an axial offset pitch between the drive side encoder ring section and the driven side end of the torsion spring bridge. The sensor carrier attached to the driven side thus allows a direct measurement of relative rotation between the driven side sensor and the drive side encoder ring section. Furthermore, the absolute angle of rotation of the driven side can be scanned on the sensor bridge at any arbitrary axial position along the spanned axial offset.

In particular, the sensor carrier attached to the driven side extends radially displaced, in particular concentrically of a distortion portion of the torsion spring bridge connecting the drive member to the driven member. In particular, the sensor carrier comprises an axial section of high torsional rigidity having an increased cross section via which the driven side rotation is transferred to the driven side sensor for scanning the drive side encoder ring section.

In a preferred embodiment, the torsion moment and angle sensor comprise a sensor sleeve arranged in particular concentrically with respect to the torsion spring bridge and/or the driven side encoder ring section, which the contact-free operating sensor for scanning the angular position on the driven side encoder ring section is arranged. In particular, the sensor sleeve is realized as a reference position stationary with respect to the rotation of the drive member and/or driven member. Preferably, the sensor sleeve is arranged on a stationary housing of the device creating the torsional drive moment, such as on a housing of a control valve. The sensor sleeve encapsules at their inside both the angular positioning sensor as well as the sensor for scanning the drive side encoder ring section as well as both encoder ring sections.

In a preferred embodiment, the drive member and/or driven member comprises a torsion protection, like a lock pin for selectively blocking the drive member and/or the driven member against turning relative to a stationary sensor sleeve. In particular, the lock pin is led radially from the outside through the sensor and anchored in the drive member or driven member. Preferably, a circumferentially extending aperture is provided in the sensor sleeve through which the torsion protection protrudes and which defines a maximum rotation of the drive member or driven member relative to the sensor sleeve. In particular, each respective torsion protection protrudes radially through an opening in the sensor sleeve. In particular, the drive side encoder ring section is arranged at a sleeve side end of the respective torsion protection. In particular, the sensor for scanning the drive side encoder ring section is arranged radially outside the sensor sleeve. Thereby, a particularly maintenance friendly sensor arrangement is realized and the torsion protection function is integrated with the sensor carrier function preferably in one part.

In a preferred embodiment increased drive side encoder ring section has at least the doubled, in particular a 4-, 6-, 8-, 10-, or 50-fold increased resolution over the driven side encoder ring section. In particular, the driven side encoder ring section is realized as a magnetic pole ring having less than 10, in particular less than 6 poles, preferably 2 or 4. In particular, the drive side encoder ring section is realized as a magnetic pole ring or singular magnet, such as a bar magnet or round magnet having two poles. In particular, the sensor for scanning the drive side encoder ring section and/or the angular positioning sensor on the driven side encoder ring section is realized as an AMR-Sensor. Due to the lower requirements for the absolute angle measurement in comparison to the higher resolution relative movement measurement, a particularly cheap torsional moment and angle sensor can be provided. The torsional moment measurement thereby stays completely independent from the function of the angular sensor so that a cheaply built measurement electronic means can be used as the sensor for scanning the angular position.

The angle position sensor can alternatively scan for instance optically, particularly laser optically, inductively, capacitively, and/or magneto-elastically.

In a preferred embodiment, a radial displacement of the drive side encoder ring section relative to the driven side sensor is disabled by means of a spacer realized in particular as a rotational slide bearing. In particular, the spacer is arranged concentrically between a sensor carrier and the drive member, wherein the sensor carrier is realized in particular as a bushing concentrically surrounding the drive member. Between the sensor carrier bushing and the drive member, the spacer is concentrically fit. The constant radial distance between the drive side encoder ring section and the driven side sensor allows for exact measurements of the highest precision.

In accordance with the further aspect of the exemplary embodiment, an actuator drive for a processing plant is provided having a drive member that is connectable to a driven member of a control valve of the processing plant. The actuator drive comprises a torsional moment sensor according to the exemplary embodiment which connects the drive member of the actuator drive to the driven member of the control valve.

In a further development of this aspect of the exemplary embodiment, the torsional moment and angle sensor according to the exemplary embodiment realizes a part of a control shaft or drive shaft and/or is arranged within a drive- or valve-housing. In particular, drive shaft or control shaft can be realized together with the torsion spring bridge in one part, preferably in a bonded material connection.

The exemplary embodiment further relates to a force transmission part, such as a control rod or a control shaft, of a field device/control device, the pneumatic drive thereof actuating a control armature, such as a control valve. Thereby, the exemplary embodiment can also be directed at the field device/control device itself. According to the exemplary embodiment, the spring body is force-conductingly integrated as a force transmission part section in the force transmission part.

Further properties, advantages and features of the exemplary embodiment are described according to the enclosed drawings.

Figure 1:
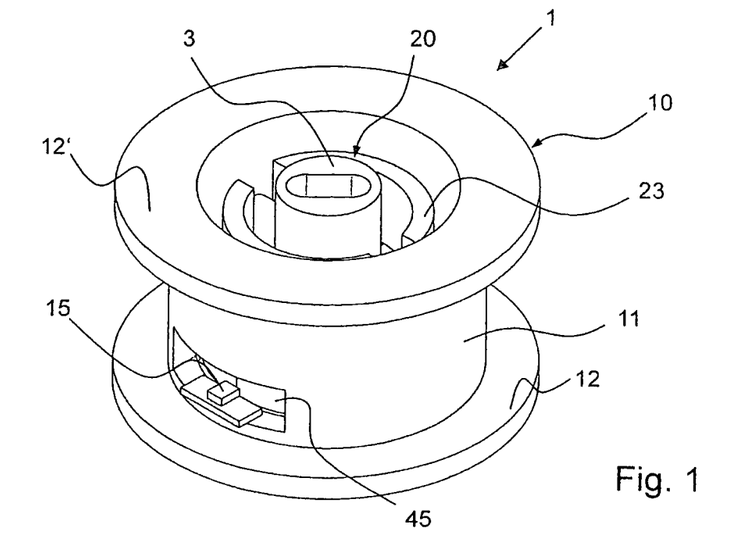
FIG. 1 is a perspective view of a first embodiment of a torsional moment and angle sensor.
Figure 2:
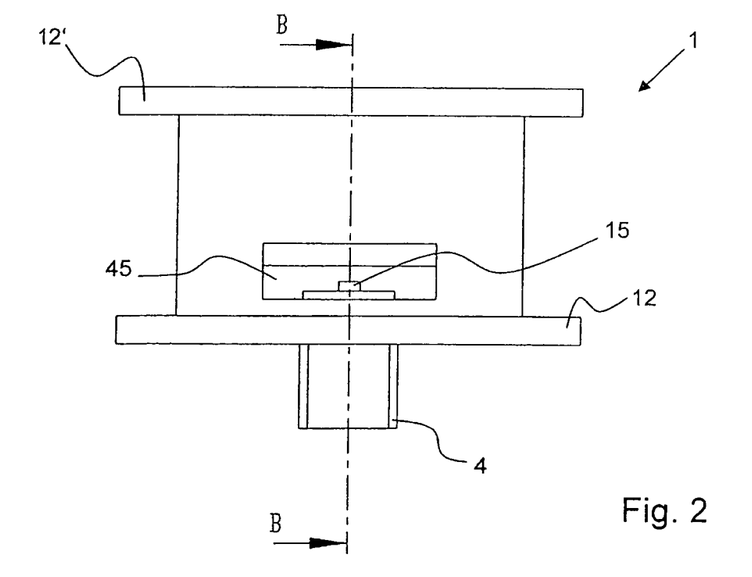
FIG. 2 is a side view of the torsional moment and angle sensor according to FIG. 1.
Figure 3:
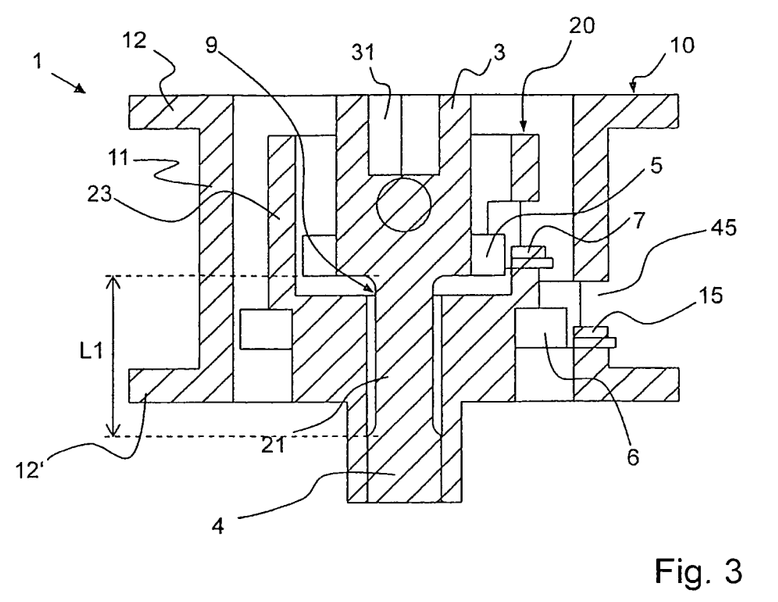
FIG. 3 is a sectional view according to the section line B-B of FIG. 2.

In FIGS. 1 through 3, the torsional moment and angle sensor according to an exemplary embodiment is generally indicated with reference numeral 1. The torsional moment and angle sensor 1 comprises a drive member 3, to which rotational drive forces are communicated, which are for instance created by an actuator drive of a processing plant.

The torsion moment and angle sensor 1 is essentially provided as an integrated assembly ready measuring cell comprising of a stator 10 which is arranged essentially static, that is: immovably or stationary on an actuator drive, a control valve or a yoke connecting the actuator drive to the control valve, and further comprises a rotor 20 rotatable relative to the stator 10. The stator 10 is realized as a sensor sleeve 11 rotationally symmetrically surrounding the rotor 20. On the axial end of the sensor sleeve 11, a respectively protruding ring flange 12, 12' is formed.

The rotor 20 comprises a torsional moment transmitting shaft extending through the stator 10. On one axial end of the shaft, a drive member 3 is realized, which comprises a form reception into which a drive shaft of an actuated drive can be positively fit for force transmission. The drive member 3 mounts axially in a torsional spring bridge 9 connecting a twisting section, piece or distortion portion 21 having increased torsional elasticity, and connects the driven member 4 on the opposite side of the shaft relative to the drive member 3. The distortion portion 21 has, for increasing torsional elasticity, a shaft diameter which is decreased by approximately 20% along a predetermined length L1. The shaft diameter and the shape of the shaft cross-section are configured such that a predefined torsional elasticity is defined along the length LI of the shaft.

The torsion spring bridge side end of the drive member 3, an encoder ring section 5 is attached to the drive member. The encoder ring section 5 is realized as a magnetic pole ring having a steep path-change of fieldlines-characteristic curve and the drive member 3 is torsionally rigidly attached or glued thereto.

On the torsion spring bridge side of the driven member 4, a sensor carrier 23 formed as a bushing is fastened, which at least partially concentrically surrounds the distortion portion 21 and the drive member 3. The sensor carrier 23 is exclusively on the drive side in a force- and/or moment-transducing connection with the shaft.

The bushing has three sections of different diameters and wall strengths, so that on the outside thereof a grading in an axial direction results. One section of the least diameter and the least wall thickness serves for fastening to the driven member 4. A medium section of larger wall thickness and medium outside diameter extends essentially along the distortion portion 21 of the torsion spring bridge 9. A carrier section of medium wall thickness and of the largest outside diameter connects to the medium section essentially on an axial height of the drive member 3.

On the bushing, a sensor 7 for scanning the drive side encoder ring section 5 is arranged in a wall aperture. The sensor 7 is realized as an AMR-Sensor and essentially arranged in the same height with respect to the encoder ring section 5, namely the polar ring. On the outer circumference of the bushing, a second encoder ring section 6, namely a second polar ring, is pinned or glued in a rotationally rigid manner. The driven side encoder ring section 6 rotates exactly with rotation or a twist of the driven member 4.

The encoder ring section 6 comprises a lower rotation path resolution than the drive side encoder ring section 5. The driven side encoder ring section 6 can for instance be a magnetic pole ring having a shallower path-change of field line-characteristic curve in comparison.

In the sensor sleeve 11 on the axial height of the driven side encoder ring section 6, a wall aperture 45 is formed in which a stationary sensor 15 is arranged scanning the driven side encoder ring section 6.

If the driven member is coupled to a mechanic rotation resistance, such as a control valve, a ball valve, or a butterfly valve, and if then the drive member 3 is provided with a torsional moment from an actuator drive, a transmission of torsional moment occurs along the distortion portion 21 of the torsion spring bridge 9. During transfer of torsional moment, the distortion portion 21 twists according to the fundamental rules of the theory of elasticity along the length LI by an angle defined by the geometry of distortion portion 21 of the modulus of shear and the modulus of elasticity thereof, so that, between the drive side end of the distortion portion 21 and the driven side end of the twisting- or rotational angle difference results. The difference of rotational angle between the encoder ring section 5 fastened to the drive side and the sensor 7 which is coupled to the driven side, displaced axially via the sensor bridge on the height of the encoder ring section 5, is measured by the sensor 7. For instance, a relative movement between sensor 7 and encoder ring section 5, which is realized as a pole ring, changes the position of the sensor 7 within the field lines running between the poles of the pole ring, which is interpreted by a magnetic field sensor and set directionally into proportion to a twisting angle. The relative movement between the encoder ring section 5 and sensor 7 is in an AMR-Sensor directly calculated in particular without a further angular measurement, to a torsional moment. The amplitude of relative movement between the encoder ring section 5 and sensor 7 thereby lies in a range of few tenths of millimeters and is negligible with respect to the rotational actuator path to be exerted onto the drive member 4.

The driven side encoder ring section 6 arranged on the sensor carrier 23 rotates rigidly and without relative movement with respect to the driven member 4 with the same angle as the driven member 4, so that an absolute rotational angle can be measured with respect to the stationary sensor sleeve 11 via the sensor 15. Therefore the same AMR-technique can be applied as in the sensor 7, wherein in a polar ring having a shallower characteristic line is applied so that the entire possible rotation angle range can be metrically mapped. Preferably, the angular measurement range is smaller than 120°, in particular between 0° and 90°.

In FIGS. 4 through 7, a second embodiment of a torsional moment and angle sensor 101 is illustrated which is equal in many aspects to the torsional moment and angle sensor 101 of FIGS. 1 through 3. Same or similar components are thus indicated with similar reference numerals increased by 100.

Figure 4:
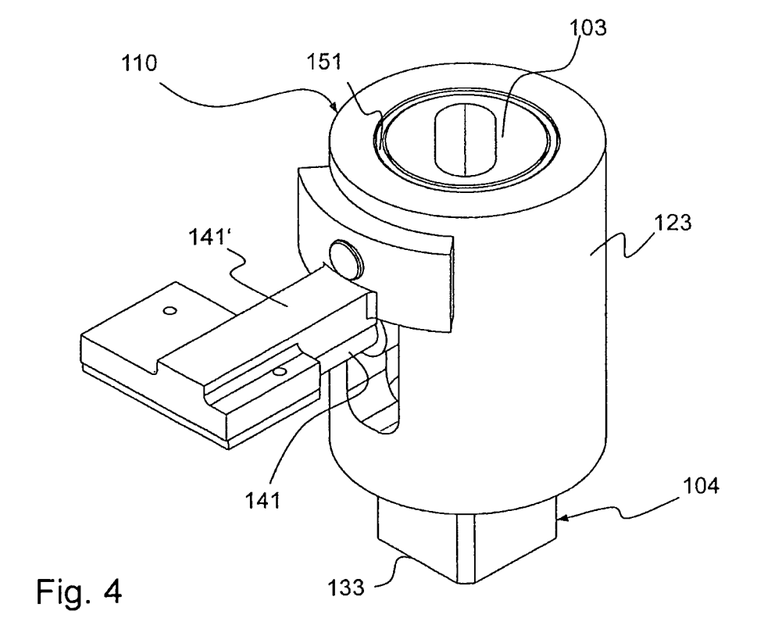
FIG. 4 is a perspective view of a second exemplary embodiment of the torsional moment and angle sensor.
Figure 5:
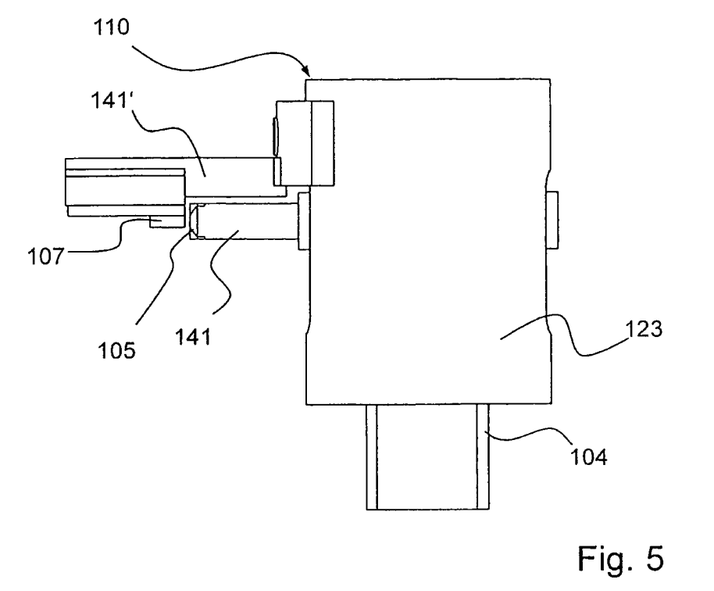
FIG. 5 is a first side view of the torsional moment- and angle sensor according to FIG. 4.
Figure 6:
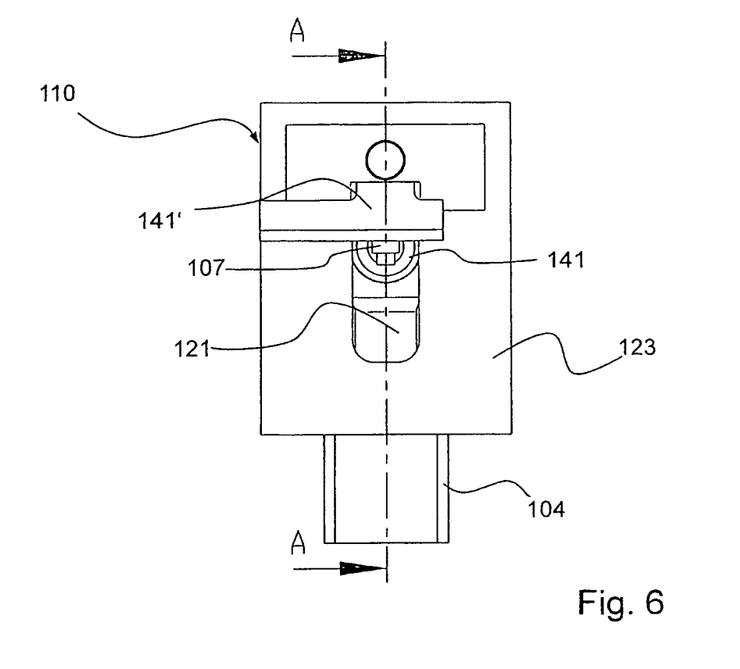
FIG. 6 is a second side view of the torsional moment and angle sensor according to FIG. 4.
Figure 7:
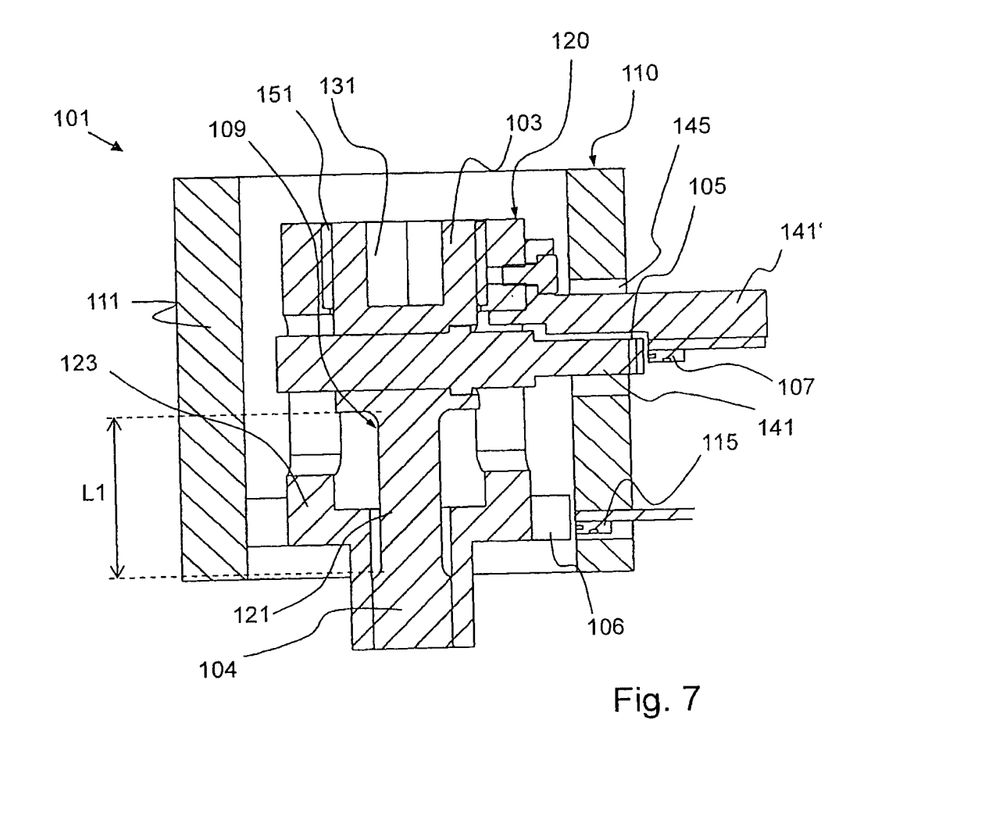
FIG. 7 is a sectional view of the torsional moment and angle sensor according to the section line A-A in FIG. 6 wherein additionally a sensor sleeve is shown which is not illustrated in FIGS. 4 through 5.

In FIGS. 4 through 6 the torsional moment and angle sensor 101 according to an exemplary embodiment is shown in its second embodiment without a sensor sleeve 111. The sensor sleeve 111 is, however, shown in the cross-sectional view of FIG. 7. The sensor sleeve 111 of the second embodiment differs from the sensor sleeve of the first embodiment according to FIGS. 1 through 3 essentially in that no radially outward protruding ring flanges 12, 12' are provided and in that next to the wall aperture for receiving a sensor 115 for scanning the angular position of the driven side encoder ring section 106, a second wall aperture or opening 145 is provided approximately on the axial height of the drive member 104.

The drive member 104 of the torsional moment and angle sensor 101 differs from the drive member according to FIGS. 1 through 3 in that it comprises a bore or receptacle radially extending through the drive member 104 into which a lock pin can be put as a torsion protection 141 through the wall aperture 145 in the sensor sleeve 111. The lock pin 141 is axially dimensioned such that it can be anchored in the drive member 104 and extends radially on the inside through the wall aperture 145 outwardly. The wall aperture 145 is dimensioned in a circumferential direction of the sensor sleeve 111 such that a twisting of the drive member 104 and thus of the lock pin is possible only within an angular range pre-determined by the circumferential length of the wall aperture 145 and the width of the locking pin. Thus, a torsional protection 141 is realized for the drive member 103.

The encoder ring section 6 which in FIGS. 1 through 3 is pinned immediately onto the drive member 3 is in the torsional moment and angle sensor 101 fastened to the sleeve side facing front of the lock pin as an encoder ring section 105. The encoder ring section 105 is configured as a permanent magnet.

The sensor carrier 123 is different from the sensor carrier 23 shown in FIGS. 1 through 3 in that the sensor for scanning the drive side encoder ring section 105 is not immediately fastened to the bushing of the sensor carrier. The sensor 107 for scanning the drive side encoder ring section 105 is radially outwardly offset by means of a carrier arm. The carrier arm extends essentially parallel to the lock pin 141 through the wall aperture 145 in the sleeve 111. The carrier arm thus forms a torsion protection 141' of the driven member 104 relative to the actuator drive side- and/or control valve side-stationary sleeve 111. The carrier arm is attached to the sensor carrier bushing by means of a fastening pin or a screw. Since the drive side sensor 105 is arranged on the face side of the lock pin and the sensor 107 is radially outwardly displaced by means of the torsion protection 141', access to the sensors is simplified on the outside of the sleeve.

Through the relocation of the torsional moment sensoring means radially outward, the path traveled relative to the sensor 107 by the encoder ring section 105 due to a twisting of the torsion spring bridge 109 is amplified so that with a relatively small resolution even minimal deformations of the twisting section 121 can be detected.

The drive member 104 is slidably borne with respect to the sensor carrier 123 by means of a sliding bearing 151. The sliding bearing bushing exactly defines a radial distance between drive side encoder ring section 105 and the driven side sensor 107 and prohibits a change of distance in the radial direction which could falsify measurements.

Figure 8:
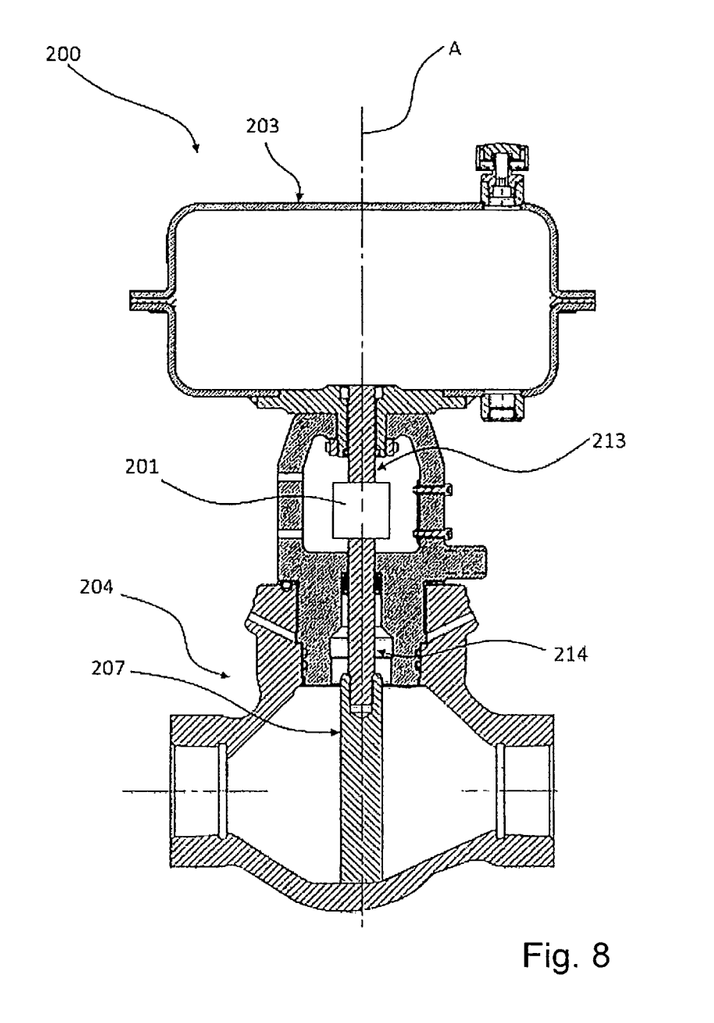
FIG. 8 is a schematic view of a field device according to an exemplary embodiment with a stylized torsional moment and angle sensor according to an exemplary embodiment.

FIG. 8 shows a field device 200 comprising pivoting-actuator drive 203 which is only schematically illustrated, and by which the control valve 204 of the field device 200 is operated. The field device 200 has a control armature realized as a control valve 204 with rotationally movable valve member 207 or throttle which is also shown only schematically. For transferring the actuating torsion moment from the actuator drive 203 to the valve member 207, control shaft 214 and a actuator shaft 213 are provided.

In FIG. 8, a torsional moment and angle sensor 207 between the control shaft 214 and the actuator shaft 203 of the field device 200 is shown purely schematically. The torsional moment and angle sensor 207 comprises a torsion spring bridge (not shown in detail in FIG. 8) which transfers the torsion moment provided from the actuator drive 203 for the control valve 204. As a control member, a valve member 207 is provided, which is rotatable for closing or opening the valve 204 relative to the axis A of rotation of the shafts 214, 213.

The features disclosed in the above description, the figures and the claims can be of importance for the realization of the invention and the different exemplary embodiments thereof both individually as well in any combination thereof.

LIST OF REFERENCE NUMERALS

1, 101, 201 torsional moment and angle sensor
3, 103 drive member
4, 104 driven member
5, 6, 105, 106 encoder ring section
7, 107 sensor
9, 109 torsion spring bridge
10 stator
11, 111 sensor sleeve
12, 12' ring flange
15, 115 sensor
20 rotor
21, 121 distortion portion
23, 123 sensor carrier
141, 141' torsion protection
145 wall aperture
151 sliding bearing
200 field device
203 actuator drive
204 control valve
207 valve member
213 actuator shaft
214 control shaft
A axis of rotation
L1 length Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim as our invention:

1. A torsional moment and angle sensor for determining a torsional moment to be transferred from a drive member to a driven member, comprising:
    an at least partially circumferential drive side encoder ring section;
    a contactless scanning sensor configured to scan the drive side encoder ring section; and
    a driven side encoder ring section via which an angular position of the driven member is scanned, the contactless scanning sensor being coupled to the drive side encoder ring section via a torsion spring bridge having a predetermined torsional elasticity, wherein at least one of:
    a sensor carrier is attached at the drive side and spans an axial offset between the drive side encoder ring section and the driven side end of the torsion spring bridge; and
    the sensor carrier is attached at the drive side and extends radially displaced with respect to a distortion portion at the torsion spring bridge, the distortion portion connecting the drive member with the driven member.

2. The torsional moment and angle sensor of claim 1 wherein the encoder ring section comprises a pole ring section.

3. The torsional moment and angle sensor according to claim 1 wherein the drive side scanning sensor and the driven side encoder ring section are rigidly coupled to one another.

4. The torsional moment and angle sensor according to claim 1 wherein the torsional moment and angle sensor determines torsional moment independent of the scanning of the angular position of the driven member.

5. The torsional moment and angle sensor according to claim 1 wherein the contactless scanning sensor is arranged rotatably relative to an angle position sensor configured to scan the driven side encoder ring section.

6. The torsional moment and angle sensor according to claim 1 wherein the torsion spring bridge comprises:
    a torsion transferring distortion portion between the drive member and the driven member; and
    a sensor carrier which is substantially decoupled from torsion flowing between the drive member and the driven member.

7. The torsional moment and angle sensor according to claim 6 wherein at least one of:
the distortion portion receives on a drive side end thereof the drive side encoder ring section; and
the sensor carrier is attached to a driven side end of the distortion portion.

8. The torsional moment and angle sensor according to claim 1 wherein the torsional moment and angle sensor further comprises a sensor sleeve arranged at least one of:
concentrically with respect to the torsion spring bridge; and
with respect to the driven side encoder ring section on which a contactless operating sensor configured to scan the angular position on the driven side encoder ring section is arranged.

9. The torsional moment and angle sensor according to claim 1 wherein at least one of:
the drive member or the driven member includes a torsion protection configured to selectively lock the drive member or the driven member against torsion relative to a stationary sensor sleeve;
the drive side encoder ring section is arranged at a sleeve side end of the respective torsion protection; and
the contactless scanning sensor is arranged radially outside the sensor sleeve.

10. The torsional moment and angle sensor according to claim 1 wherein the drive side encoder ring section includes an at least doubled increased resolution with respect to the drive side encoder ring section.

11. The torsional moment and angle sensor according to claim 9 wherein the drive side encoder ring section is realized as at least one of:
a magnetic pole ring having less than 10 poles;
as a magnetic pole ring or single magnet;
the contactless scanning sensor; and
a sensor configured to scan the angular position on the drive side encoder ring section and realized as an anisotropic magnetoresistance (AMR) sensor.

12. The torsional moment and angle sensor according to claim 1 wherein a radial displacement of the drive side encoder ring section relative to the driven side sensor is disabled by a spacer.

13. An actuator drive for a processing plant, comprising:
a pneumatically actuated drive member configured to couple to a driven member of a positioning valve of the processing plant; and
a torsional moment and angle sensor configured to determine a torsional moment being transferred from the drive member to the driven member, the torsional moment and angle sensor including:
an at least partially circumferential drive side encoder ring section;
a contactless scanning sensor configured to scan the drive side encoder ring section; and
a driven side encoder ring section via which an angular position of the driven member is scanned, the contactless scanning sensor being coupled to the drive side encoder ring section via a torsion spring bridge having a predetermined torsional elasticity, wherein at least one of:

a sensor carrier is attached at the drive side and spans an axial offset between the driven side encoder ring section and the driven side end of the torsion spring bridge; and
the sensor carrier is attached at the drive side and extends radially displaced with respect to a distortion portion at the torsion spring bridge, said distortion portion connecting the drive member with the driven member.

14. A torsional moment and angle sensor for determining a torsional moment to be transferred from a drive member to a driven member, comprising:
an at least partially circumferential drive side encoder ring section;
a contactless scanning sensor configured to scan the drive side encoder ring section;
a driven side encoder ring section via which an angular position of the driven member is scanned, the contactless scanning sensor being coupled to the drive side encoder ring section via a torsion spring bridge having a predetermined torsional elasticity; and
a sensor sleeve arranged at least one of:
concentrically with respect to the torsion spring bridge; and
with respect to the driven side encoder ring section on which a contactless operating sensor configured to scan the angular position on the driven side encoder ring section is arranged.

15. The torsional moment and angle sensor of claim 14 wherein the encoder ring section comprises a pole ring section.

16. The torsional moment and angle sensor according to claim 14 wherein the drive side scanning sensor and the driven side encoder ring section are rigidly coupled to one another.

17. The torsional moment and angle sensor according to claim 14 wherein the torsional moment and angle sensor determines torsional moment independent of the scanning of the angular position of the driven member.

18. The torsional moment and angle sensor according to claim 14 wherein the contactless scanning sensor is arranged rotatably relative to an angle position sensor configured to scan the driven side encoder ring section.

19. The torsional moment and angle sensor according to claim 14 wherein the torsion spring bridge comprises:
a torsion transferring distortion portion between the drive member and the driven member; and
a sensor carrier which is substantially decoupled from torsion flowing between the drive member and the driven member.

20. The torsional moment and angle sensor according to claim 14 wherein at least one of:
the drive member or the driven member includes a torsion protection configured to selectively lock the drive member or the driven member against torsion relative to a stationary sensor sleeve;
the drive side encoder ring section is arranged at a sleeve side end of the respective torsion protection; and
the contactless scanning sensor is arranged radially outside the sensor sleeve.

* * * * *